(12) United States Patent
Bell et al.

(10) Patent No.: US 8,046,997 B2
(45) Date of Patent: Nov. 1, 2011

(54) EXTERNAL SPRING SUPERCHARGER BYPASS VALVE

(76) Inventors: James E. Bell, Upland, CA (US); Jodi L. Bell, Alta Loma, CA (US)

( * ) Notice: Subject to any disclaimer, the term of this patent is extended or adjusted under 35 U.S.C. 154(b) by 388 days.

(21) Appl. No.: 12/473,097

(22) Filed: May 27, 2009

(65) Prior Publication Data
US 2010/0300415 A1  Dec. 2, 2010

(51) Int. Cl.
*F02B 33/44* (2006.01)
(52) U.S. Cl. .......................... 60/611; 123/564
(58) Field of Classification Search ............ 60/600, 60/601, 611; 123/564, 559
See application file for complete search history.

(56) References Cited

U.S. PATENT DOCUMENTS

| | | | | |
|---|---|---|---|---|
| 2,311,936 A * | 2/1943 | Elfes et al. | ..................... | 123/564 |
| 2,559,859 A * | 7/1951 | Elliott et al. | ............. | 123/406.69 |
| 4,656,992 A * | 4/1987 | Oonaka et al. | ............. | 123/559.3 |
| 4,727,847 A * | 3/1988 | Takeda et al. | ................. | 123/564 |
| 4,766,873 A * | 8/1988 | Miyagi et al. | .............. | 123/559.3 |
| 4,800,863 A * | 1/1989 | Miyagi et al. | .............. | 123/559.3 |
| 4,802,456 A * | 2/1989 | Okane et al. | ................... | 123/564 |
| 2006/0016437 A1 * | 1/2006 | Ozawa | ........................... | 123/564 |
| 2009/0260603 A1 * | 10/2009 | Bucknell | ....................... | 123/564 |

* cited by examiner

*Primary Examiner* — Thanh Lam
(74) *Attorney, Agent, or Firm* — Kenneth L. Green

(57) ABSTRACT

A screw compressor type supercharger includes an improved supercharger bypass valve including a spring biasing the bypass valve towards an open position. The spring may be a compression spring integrated into a bypass valve diaphragm, an extension spring extending parallel to a diaphragm arm, or a torsion spring on a bypass valve butterfly shaft. The spring is selected and installed to hold the bypass valve open at all vacuum levels and at up to one PSI of boost, and then to allow the bypass to close between one PSI and six PSI boost, and to be closed at above six PSI boost. The resulting control of the bypass valve prevents damage to the supercharger.

17 Claims, 8 Drawing Sheets

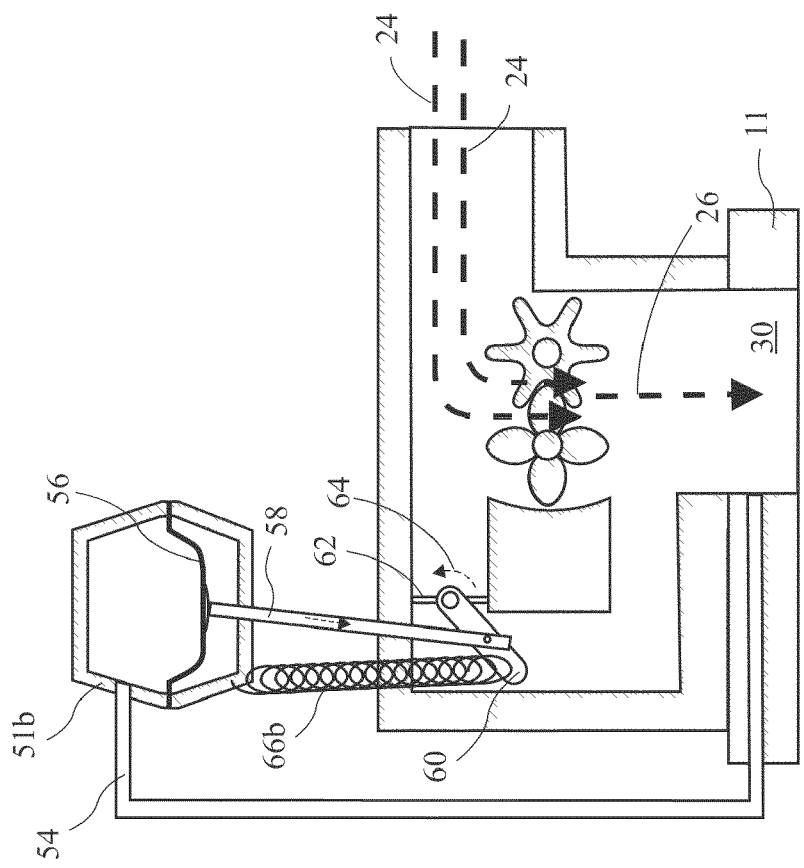
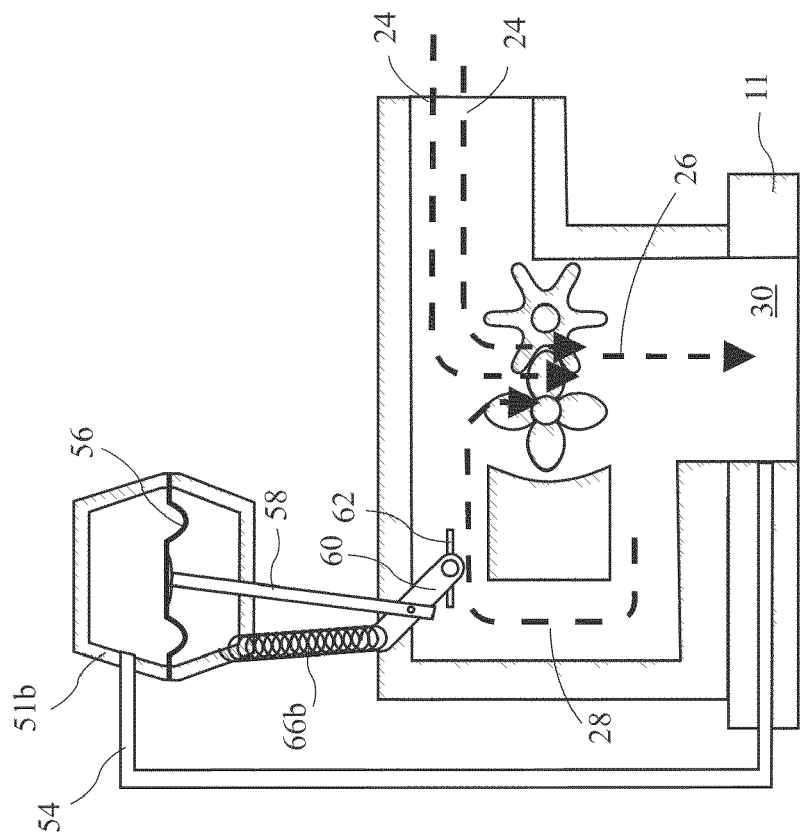

EXTERNAL SPRING SUPERCHARGER BYPASS VALVE

BACKGROUND OF THE INVENTION

The present invention relates to supercharger bypass valves and in particular to an external spring used to alter closing of the supercharger bypass valve.

Power production of an internal combustion engine is ultimately limited by the amount of air introduced into each engine cylinder. Fuel systems can at best provide an optimal amount of fuel to burn with the air contained in the cylinder, and adding more fuel than required for a stoichiometric air-fuel ratio does not result in more energy being produced. The power production of non-supercharged engines is thus limited by the engine's ability to draw air into each cylinder, referred to the Volumetric Efficiency (VE) of the engine, where 100 percent VE is equivalent to complete filling of the cylinder at bottom dead center at one atmosphere of pressure. While some engines achieve greater than 100 percent VE using tuned intake manifolds, the effects are generally limited to a small RPM range which the intake is tuned to.

Power production may also be realized by raising the RPM that an engine is operated at, thereby pumping more air through the engine. Unfortunately, high RPM operation requires cam lobe designs which are inefficient at low RPM, and is also stressful on engine parts.

An alternative method for increasing power production is to pump (or force) air into the engine. This approach is commonly called supercharging because more air is forced into each cylinder than 100 percent VE produces. For many years, supercharging was limited to special applications because of the power required to operate the supercharger (i.e., the parasitic draw of the supercharger) resulting in reduced fuel economy under all operating conditions.

One known supercharger is a screw compressor type supercharger employed to pump air into the engine at greater than atmospheric pressure to increasing horsepower. Screw compressor superchargers employ a pair of rotating screw elements within a confined cylindrical housing. The rotating screw elements draw air from a throttle body at an aft end of the housing and push the air progressing toward a forward end of the housing thereby compressing the air. The compressed air is then delivered into an intake manifold of the internal combustion engine. Providing the compressed air (commonly referred to as boost) dramatically increases engine horsepower production and allows immediate and tremendous acceleration.

However, maximum performance is not always required or desired from an engine and is only infrequently required from the engine in a street driven vehicle. The pressure boost generated by constantly running a supercharger elevates intake air temperature that causes ill effects on the engine, performance, fuel economy, and emissions. Therefore, for normal driving, it is ideal to effectively disconnect the compressor, but unfortunately, known means for selectively engaging and disengaging a supercharger are not cost effective.

As a solution to the ill effects of a constantly running supercharger, both original equipment and aftermarket supercharger systems have been developed which selectively bypass the compressed heated air flow back to the supercharger inlet during non-performance driving. Such bypassing eliminates the negative effects of the supercharger at low speeds while still providing a highly efficient method for producing significant horse power gains. Such bypassing further maintains reasonable and often provides improved fuel economy. The control of such bypassed air flow is commonly performed by a bypass valve. Unfortunately, known bypass valves work well at low boost pressures common in production cars, for example, below 6 PSI boost (or MAP of 20.7 PSIA), but not always satisfactory for high boost pressures, for example, from 6 to 20 PSI (or MAP from 20.7 PSIA to 34.7 PSIA) of modern high performance superchargers.

Further, modern vehicle engines provide significant improvements in speed, economy, and emissions through the use of computer controlled Electronic Fuel Injection (EFI) systems. The EFI systems measure engine parameters and determine how much fuel to provide to the engine for efficient operation. Known EFI systems fall into three categories Alpha N systems; Speed Density systems; and Mass Air Flow systems.

Alpha N systems tend to be simple and compute fuel requirements based on RPM and throttle position. The RPM and throttle position are provided to simple lookup tables and the fuel requirement results. Alpha N systems often work well in racing engines operated at wide open throttle, but are difficult to tune to a wide operating range.

Speed Density systems receive engine RPM, throttle position, intake manifold vacuum, and intake air temperature, and compute airflow requirements using a much larger lookup table than an Alpha N system. Some Speed Density systems also include an oxygen ($O_2$) sensor in the exhaust system to provide closed loop operation. In closed loop operation the system uses the air/fuel ratio from the O2 sensor to adapt to current conditions and adjust for engine wear. Some General Motors and most Dodge fuel injection systems use Speed Density systems.

Mass Air Flow (MAF) systems include an MAF sensor mounted in front of the throttle body which directly measures the amount (mass) of air inducted into the engine. A known MAF sensor is a hot wire sensor. Air flows over a heated wire and draws away some of the heat. The amount of current required to maintain the temperature of the wire is measured and used to determine the mass of air flowing across the wire. The mass of air flow, plus additional sensor data, is input to a map, and fuel requirements determined. The MAF systems offer good performance by directly measuring the air flow, but the required air flow sensor creates a restriction in some systems and reduces performance.

Chrysler Speed Density systems include Drive-By-Wire throttle position control and are designed to operate in a Manifold Air Pressure (MAP) range of approximately zero to 15 Pounds per Square Inch Absolute (PSIA) (where one atmosphere equals approximately 14.7 PSIA.) As a result, the software running the Chrysler Speed Density system does not lend itself to supercharged applications where MAP can exceed 15 PSIA.

More specifically, the Chrysler throttle position is controlled by software via a MAP sensor output which is translated to an airflow estimate by the Speed Density system and the airflow value is translated into a torque estimate. Under normal driving conditions, throttle position is controlled based on demand from the driver in the form of pedal position, but is also limited by a lookup table based on instantaneous torque estimates. When the driver advances the pedal position, the software limits the actual throttle position based on the lookup table. The system assumes that if the MAP sensor output reaches 14 PSIA to 15 PSIA, the airflow into the engine is at a maximum independent of throttle position, and the software no longer limits the throttle position. Under normally aspirated conditions (no boost), there is no reaction to this, because once the intake manifold absolute pressure is near or equal to one atmosphere, greater throttle position has no affect on air flow into the engine. The software thus allows throttle position to match the pedal position once one atmosphere is attained (approx 14.7 PSIA).

Unfortunately, such throttle position control produces undesirable results for supercharged (or boosted, pressures above one atmosphere) applications. Because the Chrysler software immediately allows the throttle position to match pedal position once the MAP sensor outputs reach one atmosphere, the unexpected increase in throttle position compounds the effect of boost when boost is created. In other words, there is an rapid transition from limited throttle position to unlimited throttle position (throttle position is now commanded to pedal position) as soon as the MAP sensor output increases to above one atmosphere because the Chrysler software incorrectly assumes that no boost is present.

Additionally, the bypass valve present on known superchargers rapidly closes over the same MAP range as where the throttle position is allowed to open rapidly, causing boost to increase even more rapidly. An example comparing throttle voltage (proportional to throttle position) and MAP with a standard "pre-loaded" bypass valve (STD bypass) to an throttle voltage and MAP with an improved bypass valve according to the present invention and discussed below is shown in FIG. 10. The MAP (boost) increases rapidly as the STD bypass valve closes at just below one atmosphere MAP (i.e., just before the engine transitions from vacuum to boost) just as throttle position limits are removed. This compounded application of increased throttle position and increased boost produces an undesirable "ON/OFF" feel to the driver.

Unfortunately, the Chrysler software does not have a provision to allow for a smooth transition of throttle position control above 14.7 PSIA, so it is necessary to find another way to attenuate the instantaneous increase in power being experienced with supercharged engines. Many solutions have been tried over a period of five years, including switches on the pedal, and other, but no simple, robust, solution has been found, and Chrysler engineers have failed to provide a solution to this problem.

Further, both Ford and GM Mass Air Flow (MAF) systems using STD bypass valves in conjunction with race or high lift, high overlap cams, may cause overheating of the supercharger because the STD bypass valve closes prematurely. The STD bypass valve is almost fully closed at 10 inches Hg (i.e., Map of 9.8 PSIA). Most race or high lift, high overlap cams reduce vacuum to a maximum of 10 inches Hg or less (i.e., a MAP of 9.8 PSIA or more) during cruising even where throttle positions are very low. This vacuum level forces the STD bypass valve to remain closed during most operation, often overheating the supercharger and causing premature failure.

BRIEF SUMMARY OF THE INVENTION

The present invention addresses the above and other needs by providing a solution requiring only limited altering of the Speed Density system's throttle position control. Previous unsuccessful efforts were directed to controlling throttle position. By limiting alteration of the Speed Density system's control of the throttle position, the basic off-boost operation of the vehicle is not affected by the present invention thus allowing certification for on-road use. Unlike the previous attempts, the present invention address the problem by incorporating an improved bypass valve to shift and smooth the transition from open to closed, the goals being: 1) extend valve closing period to "soften" the transition into boost; 2) shift bypass valve closing to higher MAP to lower charge temperatures; 3) smooth the ON/OFF application of power to provide fuel savings; and 4) hold the bypass valve open at cruising speeds when a high lift/duration cam is used to prevent damage to the supercharger.

The goals of the present invention are achieved by modifying the opening of the supercharger bypass valve. While an expensive computer controlled servo mechanism might be used, a simple and robust solution was found only requiring a modification involving biasing the bypass valve to close at higher boost. One method according to the present invention is to remove the internal diaphragm spring and install a compression spring inside the diaphragm housing to bias the diaphragm membrane towards an open bypass valve position. Another method according to the present invention is to remove the internal diaphragm spring and install a torsion spring on the bypass valve arm to bias the bypass valve towards the open position. A third method according to the present invention is to remove the internal diaphragm spring and install an external tension spring biasing the bypass valve to the open position. All three methods hold the bypass valve open until boost pressure (MAP greater than one atmosphere) begins to close the bypass valve and thereby smooth the application of power. Such modifications attenuate the rapid increase in power at the onset of boost due to the Chrysler software control of the throttle position, thereby providing a more acceptable driving experience.

In accordance with one aspect of the invention, there is provided a screw compressor type supercharger including an improved supercharger bypass valve including a spring biasing the bypass valve towards an open position. The spring may be a compression spring integrated into a bypass valve diaphragm, an extension spring extending parallel to a diaphragm arm, or a torsion spring on a bypass valve butterfly shaft. The spring is selected and installed to hold the bypass valve fully open at all vacuum levels and at up to one PSI of boost (i.e., MAP of 15.7 PSIA), and then to allow the bypass to transition from the open position to the closed position over the interval from one PSI boost (i.e., MAP of 15.7 PSIA) to six PSI boost (i.e., MAP of 20.7 PSIA), and to be fully closed at above six PSI boost (i.e., above MAP of 20.7 PSIA). The resulting control of the bypass valve prevents damage to the supercharger.

In accordance with another aspect of the invention, there is provided a supercharged engine. The supercharged engine includes an intake manifold and a screw compressor type supercharger connected to the intake manifold. The screw compressor type supercharger includes a supercharger housing, a forward end of the supercharger housing, a rearward end of the supercharger housing, and a compressed air passage between the forward end and the rearward end and in fluid communication with the intake manifold. A first screw rotatably resides in the supercharger housing and a second screw rotatably resides in the supercharger housing and cooperates with the first screw to draw air into the housing through the rearward end and to pump compressed air out of the housing and into the intake manifold through the compressed air passage. A bypass passage connects the compressed air passage to the rearward end and a bypass valve controls the passage of the compressed air through the bypass passage from the compressed air passage to the rearward end. A bypass valve diaphragm has an engine vacuum port in fluid communication with intake manifold vacuum and boost (i.e., MAP), and is connected to the bypass valve for opening and closing the bypass valve. The diaphragm moves the bypass valve towards an open position for increased vacuum and towards a closed position for increased boost. A bypass valve spring biases the bypass valve towards the open position, wherein the combination of the diaphragm and the spring combine to position the bypass valve in the open position for engine MAP less than approximately 15.7 PSI and in the closed position for engine MAP greater than approximately 20.7 PSI.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 7A is a second supercharger bypass valve according to the present invention in an open position.

FIG. 7B is the second supercharger bypass valve according to the present invention in a closed position.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

In the following description, pressure is referred to as vacuum, boost, and PSI Absolute (PSIA) depending on the context. Where Manifold Absolute Pressure (MAP) is referenced, the value in units of pounds per square inch is, PSIA. Where vacuum in referenced, the value in inches of Hg is 2.04*(14.7 PSI minus PSIA). There boost is referenced, the value in units of pounds per square inch is (PSIA minus 14.7).

Figure 1B:
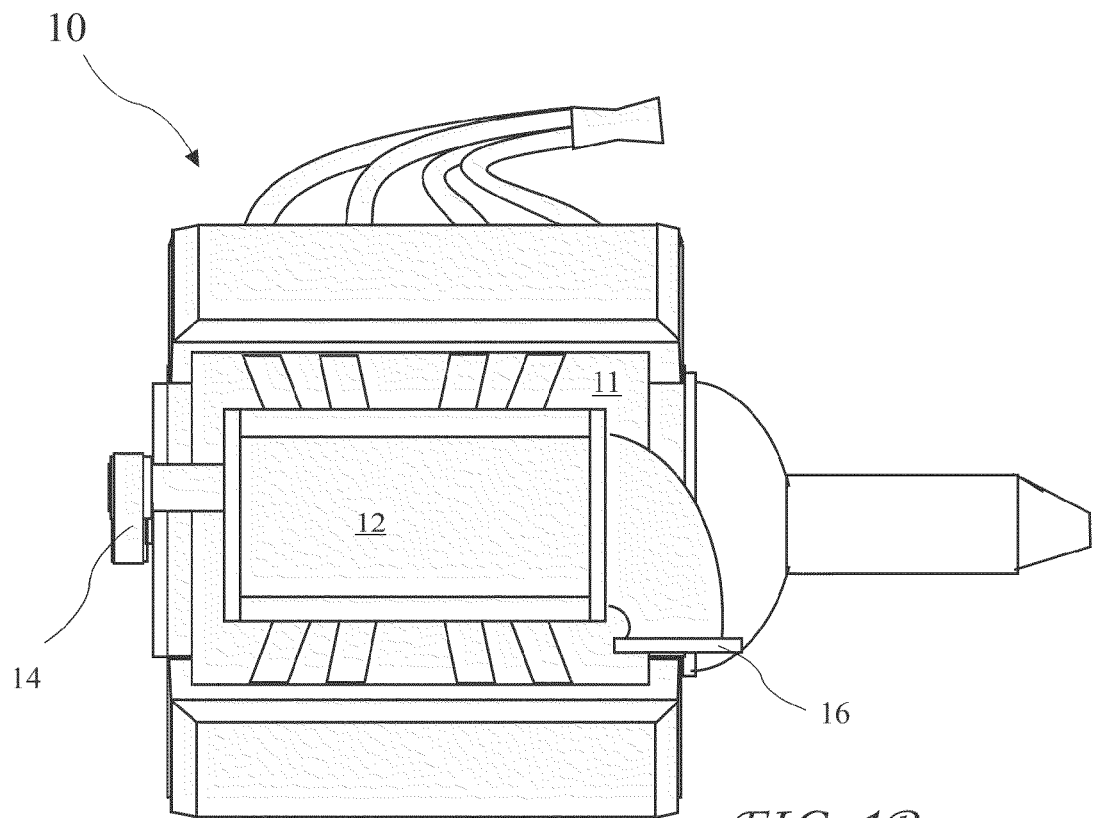
FIG. 1B is top view of the supercharged engine according to the present invention.
Figure 1A:
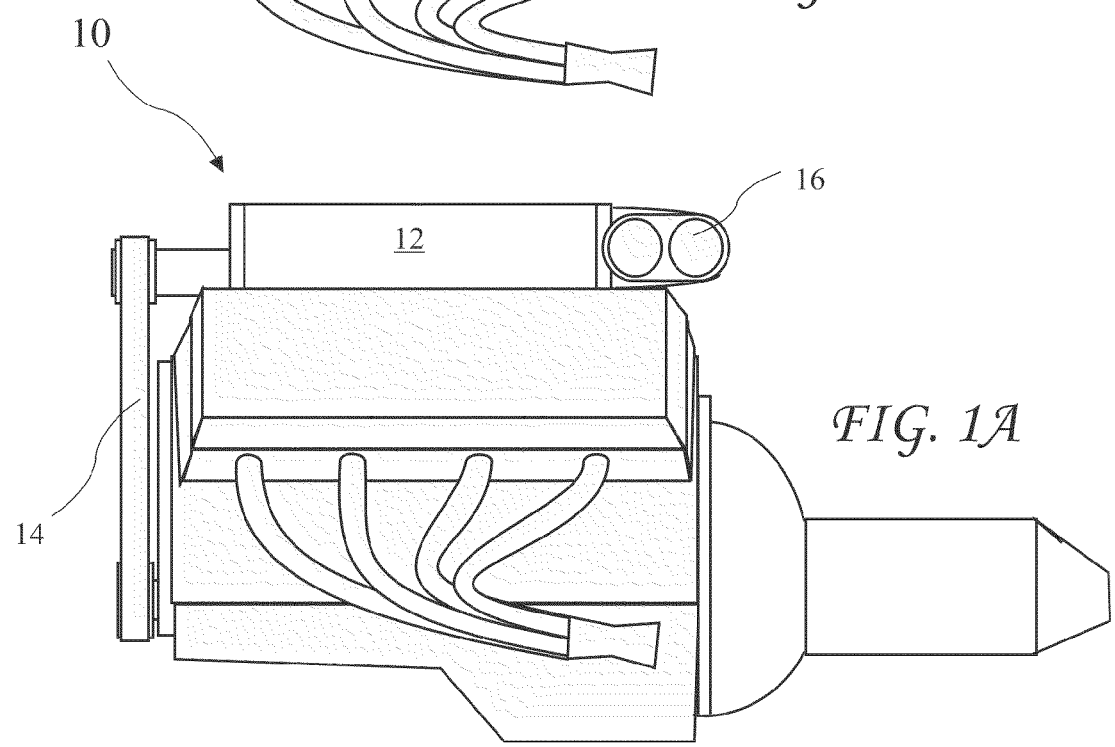
FIG. 1A is side view of a supercharged engine according to the present invention.

A side view of a supercharged engine 10 according to the present invention is shown in FIG. 1A and a top view of the supercharged engine 10 is shown in FIG. 1B. The supercharged engine 10 includes a screw compressor type supercharger 12 attached to an intake manifold 11. The screw compressor type supercharger 12 compressed air received through a throttle body 16 and provides the compressed air to the supercharged engine 10 through the intake manifold 11. The screw compressor type supercharger 12 is driven by a belt 14 connecting a crankshaft pulley to a supercharger pulley.

Figure 2B:
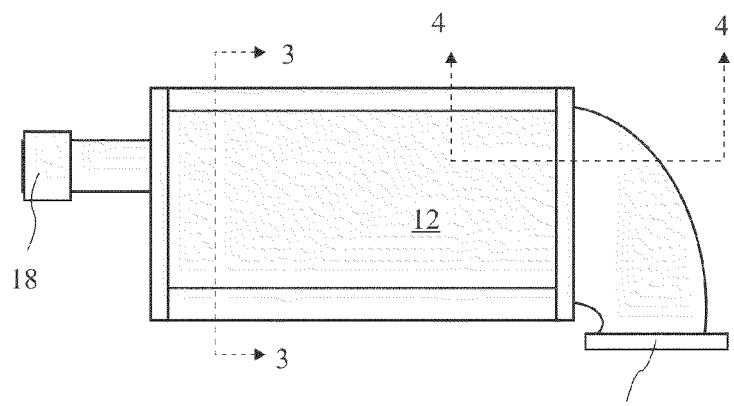
FIG. 2B is a top view of the screw compressor type supercharger according to the present invention.
Figure 2A:
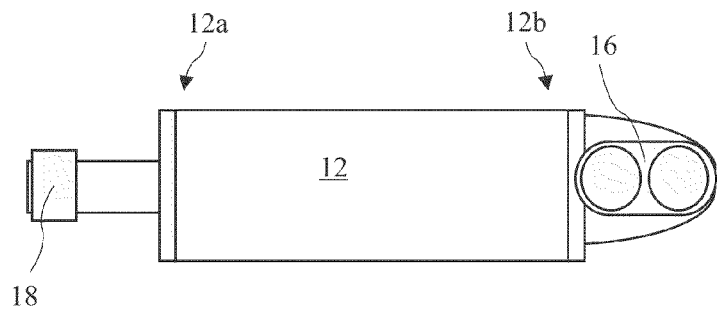
FIG. 2A is a side view of a screw compressor type supercharger according to the present invention.

A side view of the screw compressor type supercharger 12 according to the present invention is shown in FIG. 2A and a top view of the screw compressor type supercharger 12 is shown in FIG. 2B. A supercharger pulley 18 is attached to the screw compressor type supercharger 12 at a forward end 12a of the supercharger and the throttle body 16 is attached at a rearward end 12b.

Figure 3:
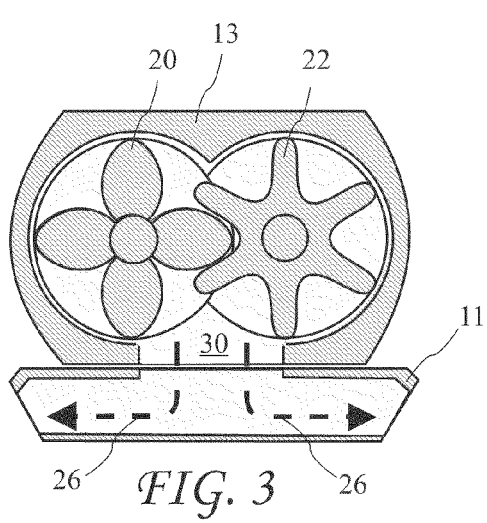
FIG. 3 is a cross-sectional view of the screw compressor type supercharger according to the present invention taken along line 3-3 of FIG. 2B.
Figure 4:
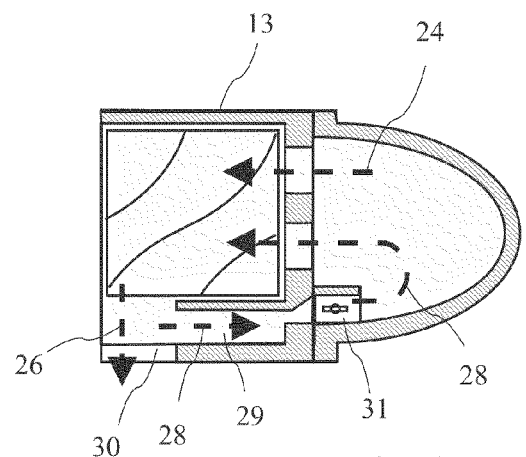
FIG. 4 is a cross-sectional view of the screw compressor type supercharger according to the present invention taken along line 4-4 of FIG. 2B.

A cross-sectional view of the screw compressor type supercharger 12 taken along line 3-3 of FIG. 2B is shown in FIG. 3 and a cross-sectional view of the screw compressor type supercharger 12 taken along line 4-4 of FIG. 2B is shown in FIG. 4. A first screw 20 and a second screw 22 are rotatably housed in a housing 13 of the screw compressor type supercharger 12. The screws 20 and 22 are turned by the pulley 18 and draw ambient air 24 through the throttle body 16 and through the rearward end 12b and into the screw compressor type supercharger 12. The ambient air is compressed inside the screw compressor type supercharger 12 by the screws 20 and 22. The compressed air 26 is pumped through compressed air passage 30 and into the intake manifold 11. A bypass passage 29 connects the compressed air passage 30 with the rearward end 12b of the screw compressor type supercharger 12. During off boost operation, a bypass valve 31 is open, allowing a portion 28 of the compressed air 26 to flow back through the bypass passage 29 to the rearward end 12b for re-circulation through the screw compressor type supercharger 12. The bypass valve 31 opens and closes to control the re-circulation of compressed air 26.

Figures 5A, 5B:
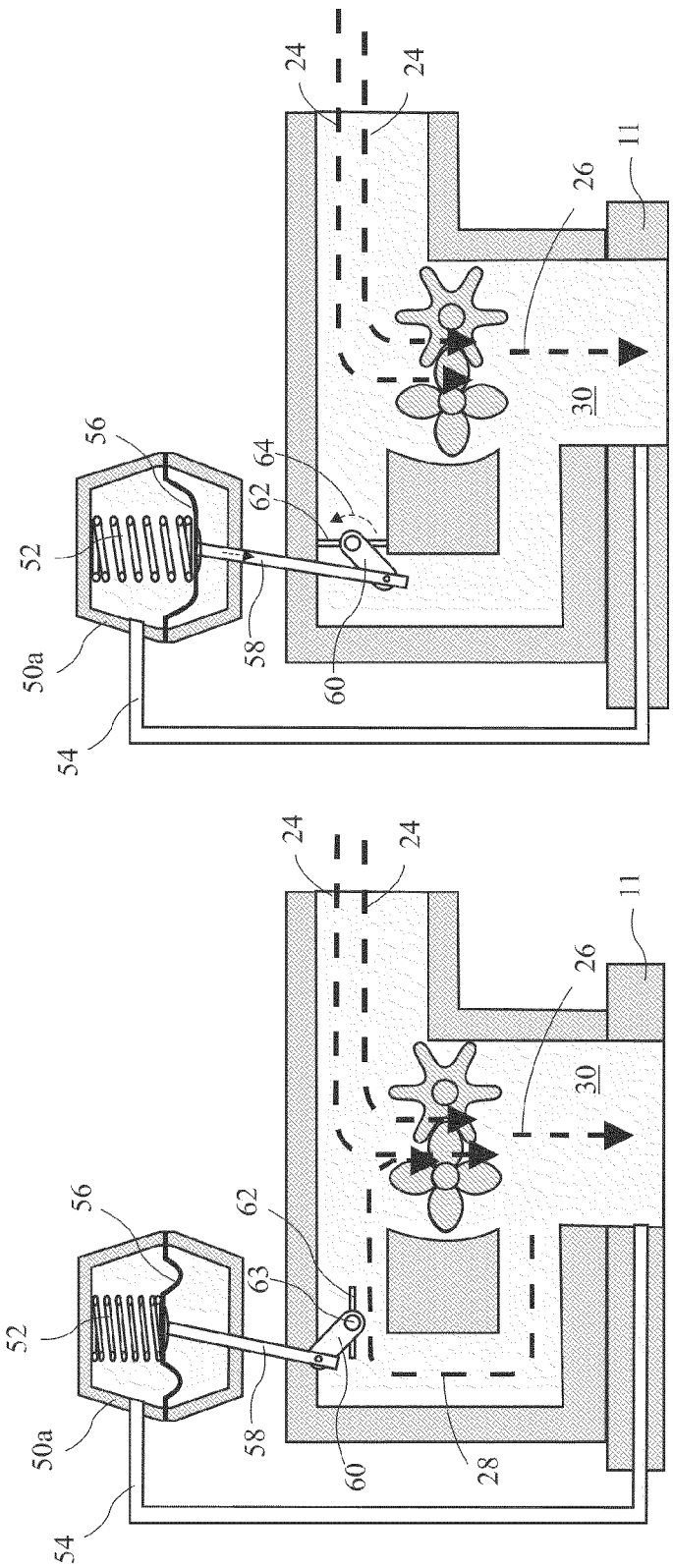
FIG. 5A is a prior art supercharger bypass valve in an open position.
FIG. 5B is the prior art supercharger bypass valve in a closed position.

A prior art supercharger bypass valve is shown in an open position in FIG. 5A and in a closed position in FIG. 5B. A butterfly valve 62 is attached to a butterfly shaft 63 which is turned by a butterfly arm 60. A diaphragm 50a is connected to the butterfly arm 60 by a diaphragm arm 58. A compression spring 52 resides inside the diaphragm 50a and against a membrane 56 biasing the membrane 56 down and the butterfly 62 towards a closed position. A vacuum line 54 provides an intake manifold vacuum signal to the diaphragm 50a and moves the butterfly 62 towards an open position for increases vacuum and towards a closed position for increased boost.

Figures 6A, 6B:
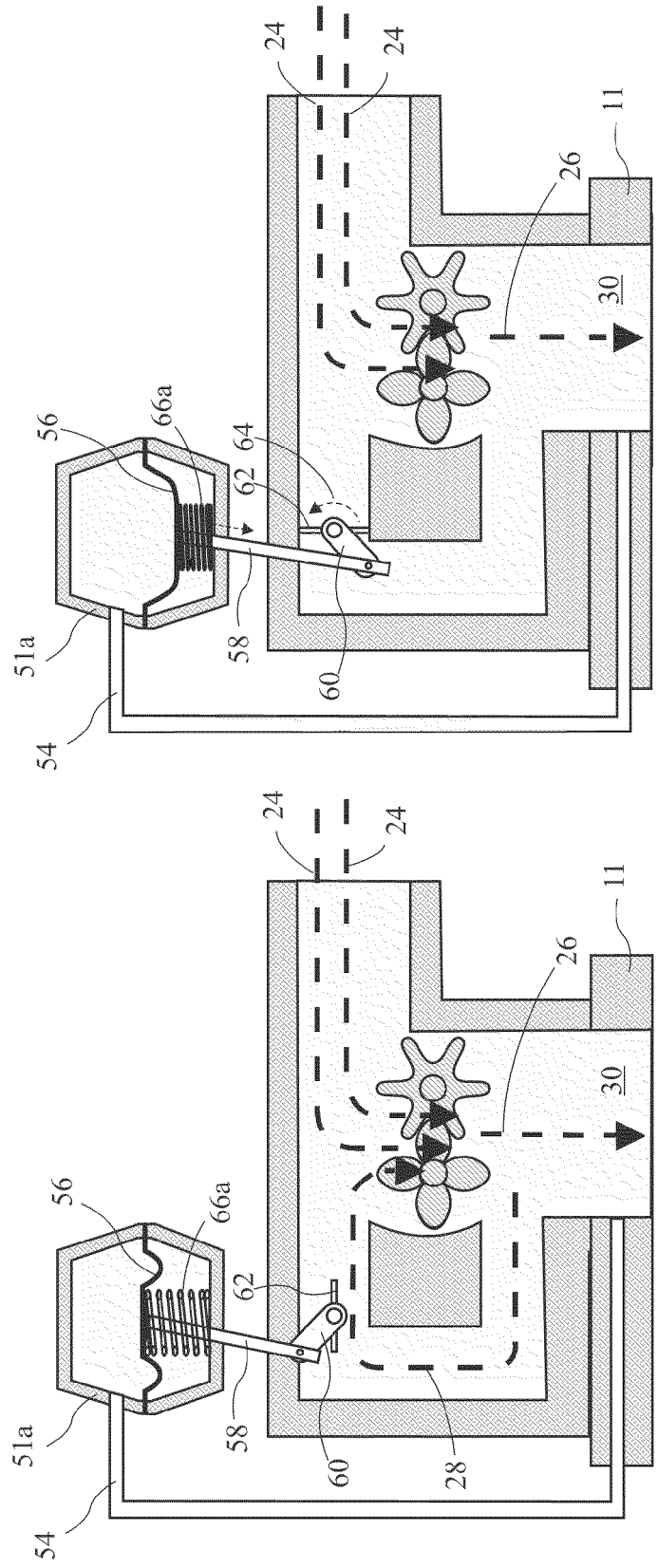
FIG. 6A is a first supercharger bypass valve according to the present invention in an open position.
FIG. 6B is the first supercharger bypass valve according to the present invention in a closed position.

A first supercharger bypass valve according to the present invention is shown in an open position in FIG. 6A and in a closed position in FIG. 6B. A first improved diaphragm 51a includes a compression spring 66a inside the diaphragm housing under the diaphragm membrane 56 and biasing the butterfly valve towards an open position. The combination of intake manifold vacuum and force from the spring 66a preferably provides a transition from open to closed bypass between a MAP of 15.7 PSIA and 20.7 PSIA. By holding the bypass valve open longer, the problems experienced with the known bypass valve described in FIGS. 5A and 5B is addressed.

A second supercharger bypass valve including a second diaphragm 51b according to the present invention is shown in an open position in FIG. 7A and in a closed position in FIG. 7B. A tension spring 66b is connected to the butterfly arm 60 and biases the butterfly valve 62 towards the open position. The tension spring 66b resides approximately parallel to the diaphragm arm 58 and is sufficiently parallel to the diaphragm arm 58 to be coupled to the action of the diaphragm arm 58 on the butterfly arm 60 to act in unison with the diaphragm arm 58 to control the position of the butterfly valve 62. The combination of intake manifold vacuum and force from the spring 66b provides a transition from open to closed bypass between a MAP of 15.7 PSIA and 20.7 PSIA. By holding the bypass valve open longer, the problems experienced with the known bypass valve described in FIGS. 5A and 5B are addressed. A typical membrane 56 is approximately 2 inches in diameter and a suitable tension spring 66b is a number 443 spring manufactured by Century Spring in Los Angeles, Calif. Other applications will generally require selecting different springs with appropriate mechanical characteristics.

Figure 8A:
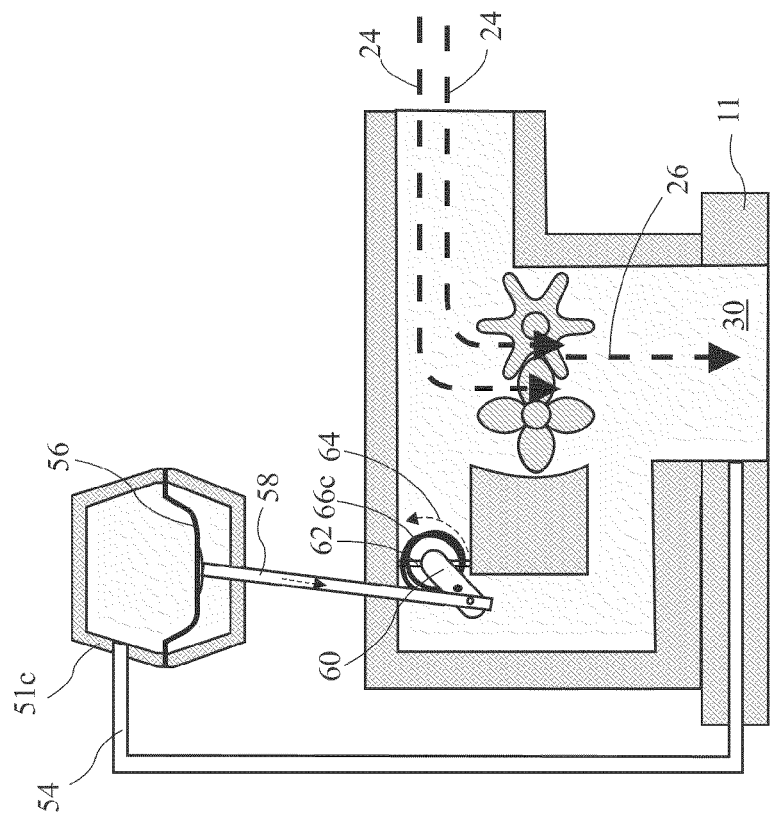
FIG. 8A is a third supercharger bypass valve according to the present invention in an open position.
Figure 8B:
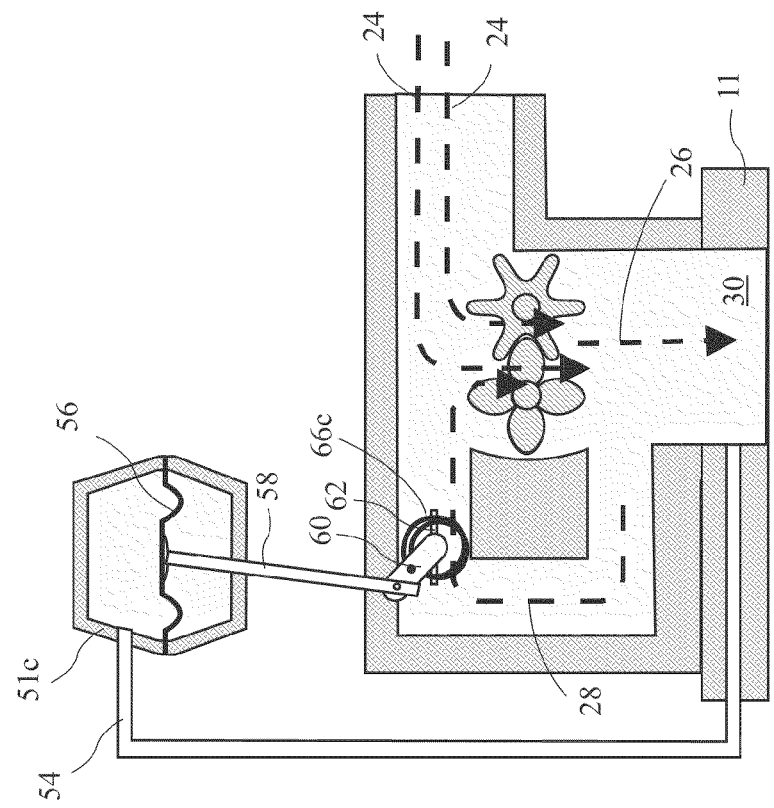
FIG. 8B is the third supercharger bypass valve according to the present invention in a closed position.

A third supercharger bypass valve according to the present invention is shown in an open position in FIG. 8A and in a closed position in FIG. 8B. A torsion spring 66c is connected to the butterfly arm 60 and biases the butterfly valve 62 towards the open position. The combination of intake manifold vacuum and force from the spring 66c provides a transition from open to closed bypass a MAP of between 15.7 PSIA and 20.7 PSIA. By holding the bypass valve open longer, the problems experienced with the known bypass valve described in FIGS. 5A and 5B is addressed.

While the present invention is described above as controlling a butterfly type valve, other valves are known in the art, and controlling any type valve as described herein is intended to come within the scope of the present invention.

Figure 9:
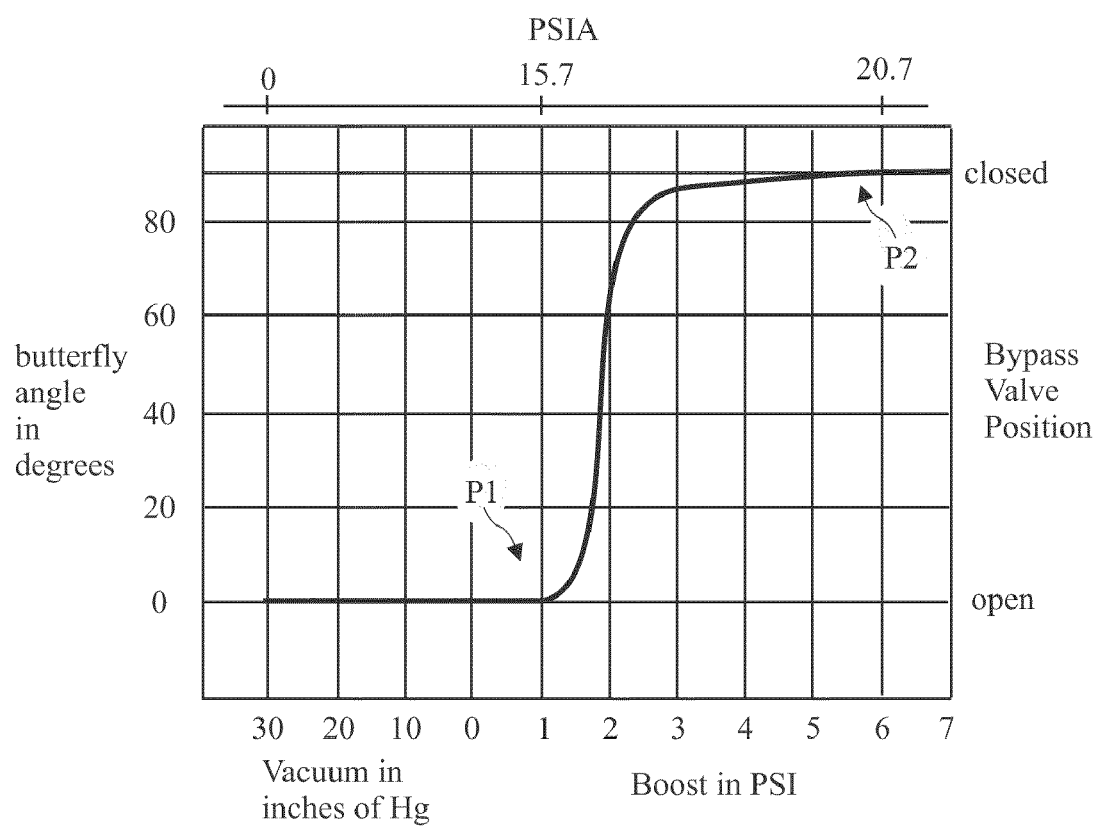
FIG. 9 is a plot of the position of the supercharger bypass valve according to the present invention as a function of vacuum and boost.

A plot of a preferred positioning of the supercharger bypass valve according to the present invention as a function of vacuum and boost (and alternatively of MAP) is shown in FIG. 9. The bypass valve starts closing at P1 and completes closing at P2. For typical applications, P1 is preferably between approximately 14.7 PSIA and approximately 16.7 PSIA and P2 is preferably between approximately 19.7 PSIA and approximately 21.7 PSIA, and more preferably P1 is approximately 15.7 PSIA and P2 is approximately 20.7 PSIA. The bypass valve remains closed at boost greater than P2. In other applications with higher boost, the bypass valve closing may be adjusted to close at higher PSIA. For example, P2 may preferably be relative to maximum boost and is adjusted to be between one PSI and two PSI below the peak boost of the supercharger, and more preferably P2 may be adjusted to be approximately one PSI below the peak boost of the supercharger. Adjusting the closing of the bypass valve is generally performed by using a different spring 66a, 66b, or 66c or by preloading the spring 66a, 66b, or 66c.

Figure 10:
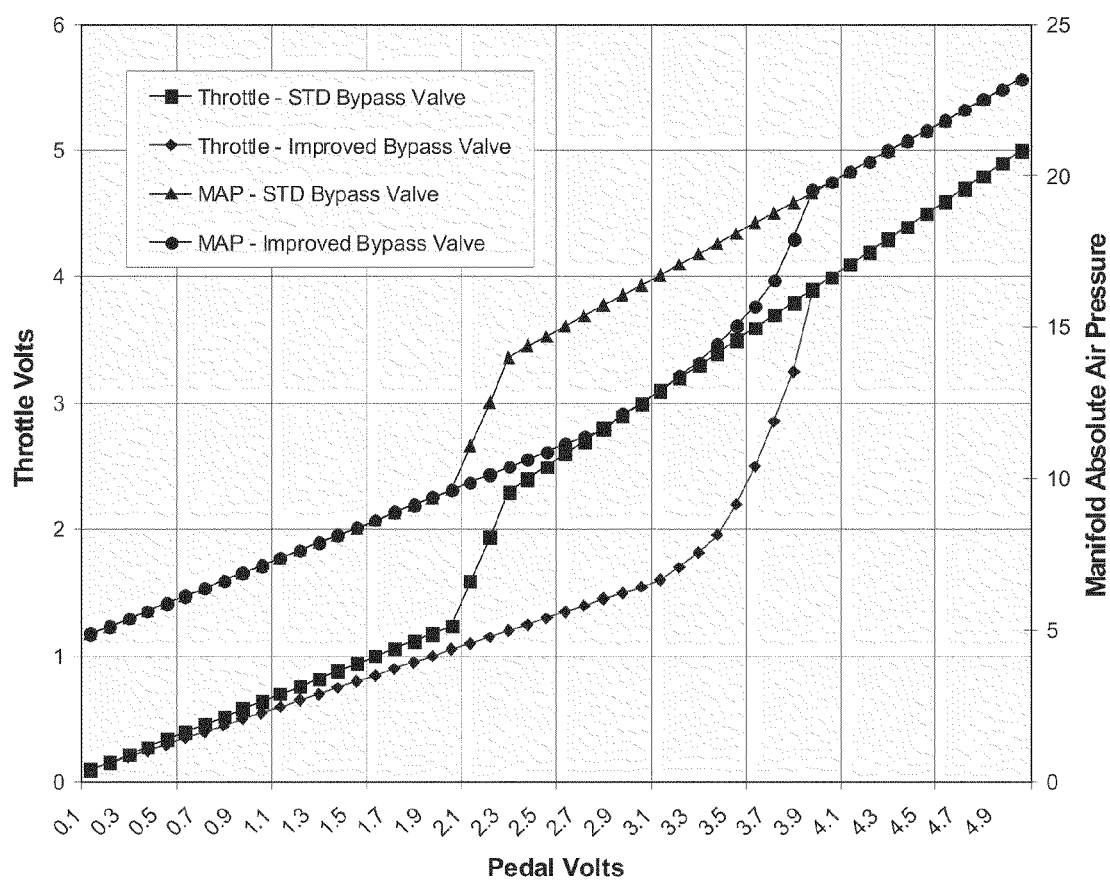
FIG. 10 shows throttle voltage and Manifold Absolute Pressure (MAP) for both a standard (STD) supercharger bypass valve and an improved supercharger bypass valve according to the present invention versus pedal voltage and a Chrysler Speed Density system controlled engine modified by adding a supercharger.

The throttle voltage and Manifold Absolute Pressure (MAP) for both a standard (STD) supercharger bypass valve and an improved supercharger bypass valve according to the present invention versus pedal voltage and a Chrysler Speed Density system controlled engine modified by adding a supercharger are shown by four plots in FIG. 10. The throttle position and MAP resulting from a STD bypass valve show a sharp increase between pedal voltage between 2.1 and 2.5 volts, resulting in an undesirable OFF/ON driving experience. The throttle position and MAP resulting from the improved bypass valve show a smooth and more gradual increase between pedal voltage between 3.1 and 4 volts, resulting in a more acceptable driving experience.

While the invention herein disclosed has been described by means of specific embodiments and applications thereof, numerous modifications and variations could be made thereto by those skilled in the art without departing from the scope of the invention set forth in the claims.

We claim:

1. A supercharged engine comprising:
    an intake manifold;
    a screw compressor type supercharger connected to the intake manifold and comprising:
        a supercharger housing;
        a forward end of the supercharger housing;
        a rearward end of the supercharger housing;
        a throttle body in fluid communication with the rearward end;
        a compressed air passage between the forward end and the rearward end and in fluid communication with the intake manifold;
        a first screw rotatably residing in the supercharger housing;
        a second screw rotatably residing in the supercharger housing and cooperating with the first screw to draw air into the housing through the rearward end and to pump compressed air out of the housing and into the intake manifold through the compressed air passage;
    a bypass passage connecting the compressed air passage to the rearward end;
    a bypass valve controlling the passage of the compressed air through the bypass passage from the compressed air passage to the rearward end;
    a bypass valve diaphragm having an engine vacuum port in fluid communication with engine intake Manifold Absolute Pressure (MAP) and connected to the bypass valve for opening and closing the bypass valve, the diaphragm moving the bypass valve toward a fully open position for low MAP and toward a fully closed position for high MAP; and
    a bypass valve spring biasing the bypass valve towards the fully open position, wherein a combination of the diaphragm and the bypass valve spring combine to position the bypass valve in the fully open position for engine MAP less than approximately 14.7 PSIA.

2. The engine of claim 1, wherein a combination of the diaphragm and the bypass valve spring combine to position the bypass valve in the fully open position for engine MAP less than approximately 15.7 PSIA.

3. The engine of claim 1, wherein the combination of the diaphragm and the bypass valve spring combine to begin to close the bypass valve at the MAP between 14.7 PSIA and 16.7 PSIA and to transition to fully closed at the MAP between 19.7 PSIA and 20.7 PSIA.

4. The engine of claim 3, wherein the combination of the diaphragm and the bypass valve spring combine to begin to close the bypass valve at the MAP of approximately 15.7 PSIA and to transition to fully closed at the MAP of approximately 20.7 PSIA.

5. The engine of claim 1, wherein the combination of the diaphragm and the bypass valve spring combine to transition the bypass valve to fully closed at the MAP of maximum boost minus between approximately one PSI and approximately two PSI.

6. The engine of claim 1, further including a Speed Density system for controlling fuel provided to the engine.

7. The engine of claim 6, wherein the Speed Density system controls a throttle position of the throttle body.

8. The engine of claim 7, wherein the Speed Density system limits the throttle position while the MAP is below approximately one atmosphere and allows the throttle position to be unlimitedly controlled by pedal position when the MAP is above approximately one atmosphere.

9. The engine of claim 8, wherein the Speed Density system control of the throttle position for non-boosted operation is not modified for boosted operation.

10. The engine of claim 1, wherein the bypass valve is a butterfly valve.

11. The engine of claim 1, wherein the bypass valve spring is a compression spring residing in the diaphragm.

12. The engine of claim 1, wherein:
the bypass valve includes a bypass valve arm for opening and closing the bypass valve;
a diaphragm arm connects the diaphragm to the bypass valve arm; and
the bypass valve spring is an extension spring residing approximately parallel to the diaphragm arm and connected to the bypass valve arm to bias the bypass valve towards the open position.

13. The engine of claim 1, wherein:
the bypass valve includes a bypass valve arm for opening and closing the bypass valve; and
the bypass valve spring is an torsion spring connected to the bypass valve arm to bias the bypass valve towards the open position.

14. The engine of claim 1, wherein the bypass valve spring is a compression spring residing in the diaphragm.

15. The engine of claim 1, further including:
a Mass Air Flow (MAF) systems controlling engine operation; and
a high performance cam resulting in less than ten inches Hg of vacuum at cruising speeds.

16. A supercharged engine comprising:
a Speed Density system designed for controlling a throttle position in non-boosted operation, wherein the Speed Density system limits the throttle position while a Manifold Absolute Pressure (MAP) is below approximately 14.7 PSIA and allows the throttle position to be unlimitedly controlled by pedal position when the MAP is above approximately 14.7 PSIA;
an intake manifold;
a screw compressor type supercharger connected to the intake manifold and comprising:
a supercharger housing;
a forward end of the supercharger housing;
a rearward end of the supercharger housing;
a compressed air passage between the forward end and the rearward end and in fluid communication with the intake manifold;
a first screw rotatably residing in the supercharger housing;
a second screw rotatably residing in the supercharger housing and cooperating with the first screw to draw air into the housing through the rearward end and to pump compressed air out of the housing and into the intake manifold through the compressed air passage;
a bypass passage connecting the compressed air passage to the rearward end;
a bypass valve controlling the passage of the compressed air through the bypass passage from the compressed air passage to the rearward end;
a bypass valve diaphragm having an engine vacuum port in fluid communication with engine intake MAP and connected to the bypass valve for opening and closing the bypass valve, the diaphragm moving the bypass valve toward a fully open position for low MAP and toward a fully closed position for high MAP; and
a bypass valve spring biasing the bypass valve towards the fully open position, wherein the combination of the diaphragm and the bypass valve spring combine to begin to close the bypass valve at the MAP of approximately 15.7 PSIA and to transition to fully closed at the MAP of approximately 20.7 PSIA.

17. A supercharged engine comprising:
a Speed Density system designed for controlling a throttle position in non-boosted operation, wherein the Speed Density system limits the throttle position while a Manifold Absolute Pressure (MAP) is below approximately 14.7 PSIA and allows the throttle position to be unlimitedly controlled by pedal position when the MAP is above approximately 14.7 PSIA;
an intake manifold;
a screw compressor type supercharger connected to the intake manifold and comprising:
a supercharger housing;
a forward end of the supercharger housing;
a rearward end of the supercharger housing;
a compressed air passage between the forward end and the rearward end and in fluid communication with the intake manifold;
a first screw rotatably residing in the supercharger housing;
a second screw rotatably residing in the supercharger housing and cooperating with the first screw to draw air into the housing through the rearward end and to pump compressed air out of the housing and into the intake manifold through the compressed air passage;
a bypass passage connecting the compressed air passage to the rearward end;
a bypass valve controlling the passage of the compressed air through the bypass passage from the compressed air passage to the rearward end;
a bypass valve diaphragm having an engine vacuum port in fluid communication with engine intake MAP and connected to the bypass valve for opening and closing the bypass valve, the diaphragm moving the bypass valve toward a fully open position for low MAP and toward a fully closed position for high MAP; and
a bypass valve spring biasing the bypass valve towards the fully open position, wherein:
a combination of the diaphragm and the bypass valve spring combine to position the bypass valve in the fully open position for engine MAP less than approximately 15.7 PSIA; and
the combination of the diaphragm and the bypass valve spring combine to transition the bypass valve to fully closed at the MAP of maximum boost minus between approximately one PSI and approximately two PSI.

* * * * *